Patented June 23, 1942

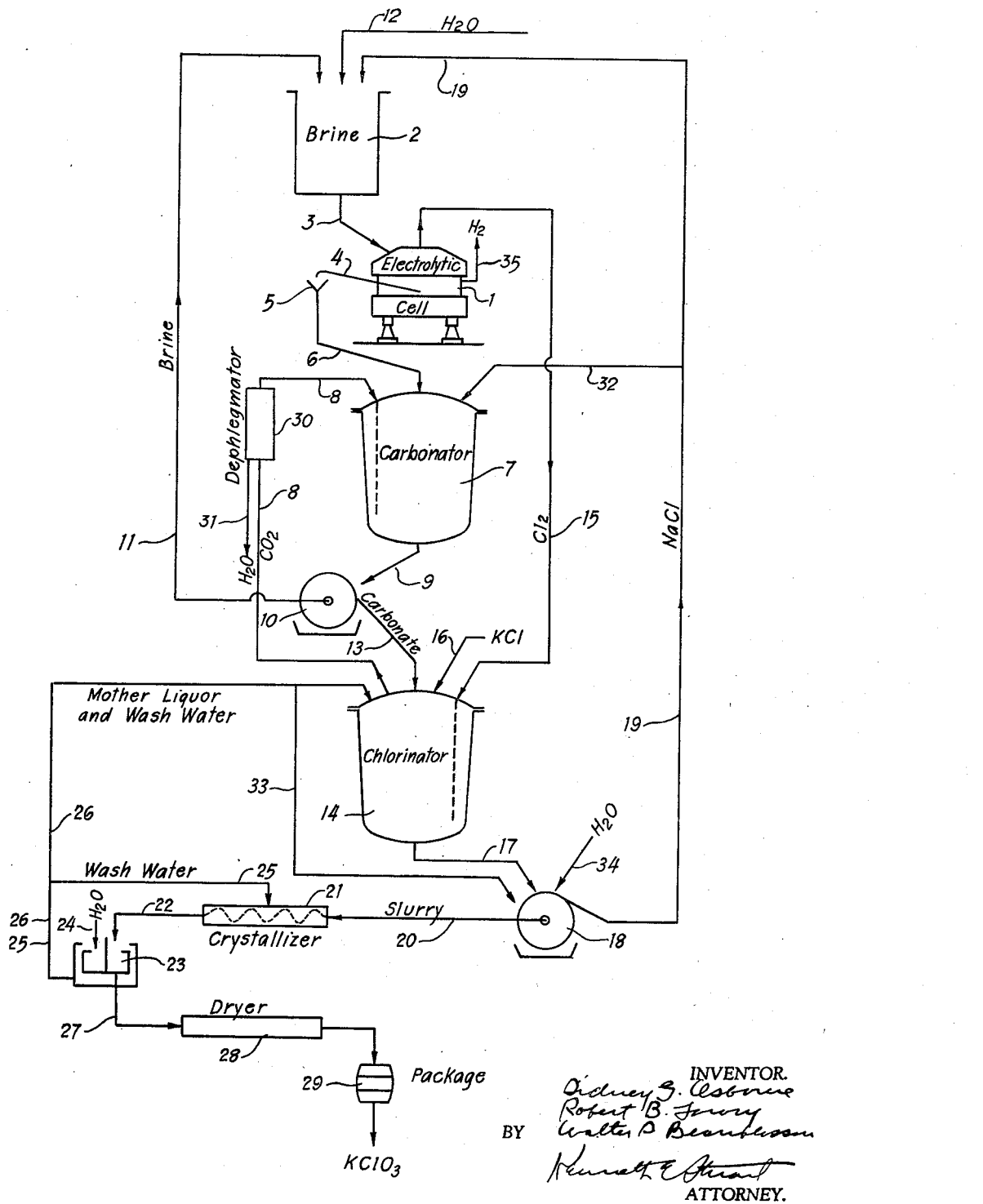

2,287,061

UNITED STATES PATENT OFFICE 2,287,061

PROCESS FOR PRODUCTION OF ALKALI METAL CHLORATES, AND MORE PARTICULARLY POTASSIUM CHLORATE

Sidney G. Osborne, St. Davids, Ontario, Canada, and Robert B. Lowry and Walter S. Beanblossom, Niagara Falls, N. Y., assignors to Hooker Electrochemical Company, Niagara Falls, N. Y., a corporation of New York Application April 15, 1940, Serial No. 329,738

15 Claims. (Cl. 23—85)

Chlorates are produced by chlorination of alkali metal and alkaline earth hydroxides and salts of weak acids, such as the carbonates.

It has been proposed to produce chlorates from alkali-chlorine cell effluent by reacting it directly with chlorine, but in that case an evaporation step is necessary to remove the sodium chloride in the effluent and formed by the reaction and recover the product. The cost of this evaporation has prevented this process from ever becoming economically practicable.

Chlorates may of course be produced by evaporating down such cell effluent to separate out the caustic alkali and reacting this with chlorine, but in this case, as in the preceding, the cost of the evaporation has proven to be prohibitive.

Sodium and potassium chlorate are also produced directly in electrolytic cells by allowing the chlorine evolved on the anode to mingle with the caustic soda produced at the cathode. Hypochlorite is formed first, and this breaks down into chlorate and chloride. The hypochlorite and chlorate are both unstable and powerful oxidants. It is therefore necessary to operate these cells below 70° C., and even at this temperature the attack on the electrodes is severe. The cathode, if of steel, is liable to rust rapidly, particularly in any recesses where circulation is not good. Even the graphite anodes are rapidly consumed by oxidation. The hydrogen evolved is found to be contaminated by carbon dioxide. Moreover, under certain conditions it may contain enough oxygen to constitute an explosive mixture. The reaction between chlorine and caustic soda takes place largely in the presence of nascent hydrogen which reduces some of the product into salt and water. The graphite also, being a reducing agent, breaks up some of the product. Oxidation of the steel accounts for still more. For these and other reasons, the yield of such cells, based upon current consumed, is seldom better than 80%. By contrast, the yield or current efficiency of the highly developed alkali-chlorine diaphragm cells is in general 90% or better. In the case of the cell illustrated in U. S. Patent No. 1,866,065, the current efficiency is ordinarily 95%. It is highly desirable therefore to be able to utilize caustic soda and chlorine produced in such cells for production of chlorates.

The crude product or effluent from alkali-chlorine cells is in general a liquor containing about 9½% NaOH and 13½% NaCl. The cell of the patent referred to, however, produces a crude effluent containing about 11% NaOH and 15½% NaCl. This increased concentration is made possible by its high efficiency and the fact that this cell is supplied with brine which is saturated at 70° C. by the process of the U. S. Patent No. 2,173,986, therefore contains about 320 grams of NaCl per liter, whereas in general electrolytic alkali-chlorine cells are supplied with brine containing about 290 grams NaCl per liter.

It is known that sodium hydroxide may be converted to sodium carbonate or bicarbonate by reaction with carbon dioxide. In the case of the electrolytic cell illustrated in Hargreaves-Bird British Patent No. 18,039 of 1892, this is accomplished by admitting steam and gases containing carbon dioxide directly to the cathode compartment of the cell. This compartment becomes completely filled with an atmosphere of the gases, so that the cell effluent containing sodium hydroxide comes into contact with the carbon dioxide as fast as it percolates through the diaphragm. The efficiency of such a cell is seldom better than 88 percent and the carbonation product is in solution. In the cell of Patent No. 1,866,065, the diaphragm is submerged, one side being in contact with the electrolyte and the other with the effluent. This is one of the reasons for the high efficiency of the cell. Obviously it would be impracticable to fill the anode compartment of this cell with an atmosphere of $CO_2$. Nevertheless it is desirable to be able to use a cell of this efficient type for production of chlorate. It would of course be possible to bubble carbon dioxide through the cathode compartment of such a cell, but since the cathode compartment is not designed for this purpose the absorption of $CO_2$ and conversion of hydroxide to carbonate would be incomplete; moreover, the hydrogen evolved in the cathode compartment of such cells, which is a valuable by product, would in that case be contaminated with $CO_2$ and its value greatly reduced.

We have found tht if effluent from such a cell is treated with $CO_2$ in an efficient absorption apparatus, more or less of the resulting sodium carbonate or bicarbonate forms a precipitate in the cell effluent, depending upon the conditions, and may be filtered out, thus separating the carbonate from the chloride without the necessity of any evaporation step. This precipitate is especially efficient in the case of the cell of Patent No. 1,866,065, because of the fact that the effluent from the cell is more concentrated with respect to NaOH and NaCl than is the effluent from such cells in general. It is also particularly true if the carbonation of the cell effluent is carried beyond the sodium carbonate stage to the point at which the product is sodium bicarbonate, since the latter is much less soluble than the former. After the carbonate or bicarbonate has been filtered out, the filtrate is of course recycled to the electrolytic cells. The carbonate or bicarbonate, after its removal from the cell effluent, may then be chlorinated to produce sodium chlorate and chloride and the carbon dioxide evolved by this chlorination recycled to produce more carbonate or bicarbonate. In this way we are able to make use of the highly efficient alkali-chlorine diaphragm cell referred to, without incurring the cost of evaporation otherwise necessary to separate the hydroxide, carbonate or bicarbonate from the chloride, or the chlorate from the chloride if the cell effluent be directly treated with chlorine, and without contaminating the valuable hydrogen produced in the cell with $CO_2$. At the same time we avoid the waste of carbon dioxide incident to producing the carbonate or bicarbonate as an end product, and chlorinating it in another plant.

The composition of the cell effluents referred to above may be expressed as follows:

|  | Weight percent | Mols |  |
| --- | --- | --- | --- |
| NaOH | 9½ to 11 | 2 | 2 |
| NaCl | 13½ to 15½ | 1.94 | 1.92 |
| $H_2O$ | 77 to 73½ | 36 | 29.7 |

It will be seen from these figures that the effluent from the cell illustrated in the patent referred to contains much less water in proportion to the solutes than that from such cells in general and is therefore much more nearly saturated.

The reaction between this cell effluent and the $CO_2$ is as follows:

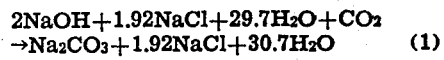

$$2NaOH + 1.92NaCl + 29.7H_2O + CO_2 \rightarrow Na_2CO_3 + 1.92NaCl + 30.7H_2O \quad (1)$$

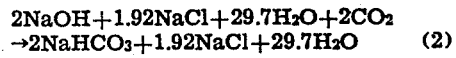

$$2NaOH + 1.92NaCl + 29.7H_2O + 2CO_2 \rightarrow 2NaHCO_3 + 1.92NaCl + 29.7H_2O \quad (2)$$

It will therefore be seen that $Na_2CO_3$ is an intermediate product in the production of $NaHCO_3$, the latter requiring twice as much $CO_2$.

After completion of the carbonation in accordance with Reactions 1 or 2 some of the carbonation product is in the form of a precipitate and some of it in solution. The solution is then brought to saturation with respect to NaCl, whereupon more carbonation product is precipitated. This is then filtered out.

*Example I.*—11 per cent NaOH unsaturated cell effluent was carbonated to $Na_2CO_3$ in accordance with Reaction 1. The composition after carbonation was as follows:

|  | Solids | Filtrate |
| --- | --- | --- |
| $Na_2CO_3$ | 23.58 | 143.0 |
| $NaHCO_3$ | 9.64 |  |
| NaCl | 7.00 | 198.6 |
| $H_2O$ |  | 1,000.0 |

This represents a yield of $Na_2CO_3$ and $NaHCO_3$ amounting to 82.9 percent of the theoretical yield, based upon current supplied to the cell and assuming the cell efficiency at 95 percent, or a yield of 14.22 percent in the precipitate.

This example shows that when the cell effluent containing 11 percent NaOH is carbonated to $Na_2CO_3$ only a minor part of the product is precipitated, which explains why the Hargreaves-Bird cell yields a product that is entirely in solution, as stated above.

*Example II.*—11 percent NaOH solution was carbonated to $Na_2CO_3$ in accordance with Reaction 1 and saturated by adding NaCl. The composition after carbonation was as follows:

|  | Solids | Filtrate |
| --- | --- | --- |
| $Na_2CO_3$ | 55.8 | 116.1 |
| $NaHCO_3$ | 23.7 | 2.0 |
| NaCl | 55.6 | 276.8 |
| $H_2O$ |  | 1,000.0 |

This represents an overall yield of $Na_2CO_3$ and $NaHCO_3$ amounting to 90.2 percent of the theoretical yield, based upon the current supplied to the cell, assuming the efficiency of the cell at 95 percent as before, or a yield of 33.9 percent in the precipitate. A comparison of this yield with that of Example I shows the necessity of saturating the menstruum with NaCl, if any considerable proportion of $Na_2CO_3$ is to be precipitated.

*Example III.*—11 percent NaOH solution was carbonated to $NaHCO_3$ in accordance with Reaction 2 and saturated by adding NaCl. The composition after carbonation was as follows:

|  | Solids | Filtrate |
| --- | --- | --- |
| $Na_2CO_3$ |  | 21.7 |
| $NaHCO_3$ | 204.9 | 9.05 |
| NaCl | 54.09 | 273.88 |
| $H_2O$ |  | 1,000.00 |

This represents an overall yield of $Na_2CO_3$ and $NaHCO_3$ amounting to 90.6 percent of the theoretical yield, based on the current supplied to the cell, assuming the efficiency of the latter as before, or a yield of 77.4 percent in the precipitate. A comparison of this yield with that of the preceding example shows that it is preferable to carbonate to the bicarbonate stage.

Instead of bringing the solution to saturation after carbonation as in Examples II and III it may be saturated before carbonation. The results are then as follows:

*Example IV.*—11 percent NaOH solution saturated by adding NaCl was then carbonated to $NaHCO_3$ in accordance with Reaction 2. The composition after carbonation was as follows:

|  | Solids | Filtrate |
| --- | --- | --- |
| $Na_2CO_3$ | 37.06 | 1.57 |
| $NaHCO_3$ | 236.89 | 9.77 |
| NaCl | 29.60 | 298.00 |
| $H_2O$ |  | 1,000.00 |

This represents a yield of $Na_2CO_3$ and $NaHCO_3$ amounting to 93.0 percent of the theoretical yield, based on the current supplied to the cell, assuming the efficiency of the latter as before, or a yield of 89.0 percent in the precipitate. A comparison of this yield with that of the preceding example shows that it is desirable to bring the solution to saturation by adding NaCl before, rather than after, carbonation.

*Example V.*—9½ percent NaOH solution saturated by adding NaCl was carbonated to $NaHCO_3$ in accordance with Reaction 2. The composition after carbonation was as follows:

|  | Solids | Filtrate |
| --- | --- | --- |
| $Na_2CO_3$ | 20.9 | 3.08 |
| $NaHCO_3$ | 208.0 | 7.50 |
| NaCl | 28.4 | 301.9 |
| $H_2O$ |  | 1,000.0 |

This represents a yield of $Na_2CO_3$ and $NaHCO_3$ amounting to 84.2 percent of the theoretical yield, based on the current supplied to the cell, assuming the efficiency of the latter at 90 percent, or a yield of 80.0 percent in the precipitate. A comparison of this result with that of Example IV shows that the yield from strong cell effluent is higher than that from weak cell effluent, when conditions are otherwise the same.

*Example VI.*—11 percent NaOH solution saturated by adding NaCl was carbonated to NaHCO₃ in accordance with Reaction 2 under a gauge pressure of 2 c. m. of mercury. The composition after carbonation was as follows:

|  | Solids | Filtrate |
|---|---|---|
| $Na_2CO_3$ | 24.8 | 2.8 |
| $NaHCO_3$ | 268.0 | 6.23 |
| $NaCl$ | 44.2 | 288.40 |
| $H_2O$ |  | 1,000.00 |

This represents a yield of $Na_2CO_3$ and $NaHCO_3$ amounting to 96.0 percent of the theoretical yield, assuming the cell efficiency at .95 as before, or a yield of 92.7 percent in the precipitate. A comparison of this result with that of Example IV shows that a slight pressure assists the absorption of $CO_2$ sufficiently to raise the yield from 89.0 to 92.7 percent.

In the foregoing examples the carbonated liquor was in every case cooled to 15° C. and allowed to stand overnight before filtration.

In the case of Example III, IV, V, and VI, in which carbonation was carried to bicarbonate, the carbonation products in the filtrate are negligible. In the case of Example I and II they are not negligible and ordinarily the precipitation of carbonate in these examples would not be considered complete enough to justify commercial operation on this basis. However, in an electrolytic alkali-chlorine installation there are other uses for sodium carbonate for which a filtrate such as those of Examples I and II can be used just as it is. For example, if there are a number of cell circuits and some of them are not used for production of chlorate, the filtrate can be returned to the brine system for the whole plant, in which case the carbonate will serve the useful purpose of precipitating lime and magnesium from the brine, for which purpose it is otherwise necessary to supply carbonate from other sources.

The batch chlorination of sodium carbonate, like the carbonation of caustic soda, proceeds by two stages, as follows:

$$2Na_2CO_3 + H_2O + Cl_2 \quad (3)$$
$$NaClO + NaCl + 2NaHCO_3 + Cl_2 \quad (4)$$

The water absorbed in Reaction 3 is therefore given back in Reaction 4. However, during the first stage represented by Reaction 1 there is a thickening of the reaction mixture. During the second stage represented by Reaction 4 there is much evolution of $CO_2$ and this not only causes foaming but carries off more water than is formed in the reaction, so that there is a further thickening. This foaming is objectionable as it necessitates diluting the reagents or providing a larger foam space in the reactor. We have found that by adding the sodium carbonate continuously or in increments during the chlorination the evolution of $CO_2$ is spread out over a longer period and the foaming is reduced; consequently the thickening of the reaction mixture at any moment is likewise reduced. This enables us to finish with a higher proportion of sodium carbonate, which is of advantage in later separating out sodium chlorate, as we shall presently show, and also to chlorinate a greater quantity of carbonate in a reactor of given capacity. Reactions 3 and 4 may be combined as follows:

$$Na_2CO_3 + Cl_2 \rightarrow NaClO + NaCl + CO_2 \quad (5)$$

The NaClO of these equations of course breaks down into $NaClO_3$ and NaCl, so that Equation 5 may be written:

$$3Na_2CO_3 + 3Cl_2 \rightarrow NaClO_3 + 5NaCl + 3CO_2 \quad (6)$$

Since sodium carbonate is converted to sodium bicarbonate during the chlorination, it is immaterial from the point of view of the final result whether the chlorination start with the carbonate or bicarbonate. Although, if this process is to start with electrolytic caustic soda, the yield is much higher if we carbonate to bicarbonate, the latter part of the process, from the chlorination step onward, is not limited to electrolytic caustic soda, but may make use of natural or other sodium carbonate. Therefore we do not wish the process to be limited to either carbonate or bicarbonate.

The sodium chlorate produced by Reaction 6 may then be converted to potassium chlorate by reaction with potassium chloride as follows:

$$NaClO_3 + KCl \rightarrow KClO_3 + NaCl \quad (7)$$

If preferred, the potassium chloride may be added before chlorination in which case Reaction 7 takes place simultaneously with Reaction 6.

In practice, the sodium carbonate or bicarbonate is chlorinated in a mother liquor left over after crystallizing out the chlorate produced by the final steps of the process to be described later. This mother liquor has typically a specific gravity of 1.233 at 10° C. and the following composition:

|  | Weight percent | Mols |
|---|---|---|
| $KClO_3$ | 4.85 | 3.95 |
| $NaCl$ | 24.90 | 42.6 |
| $H_2O$ | 70.25 | 396.0 |

This mother liquor is saturated with respect to $KClO_3$ and almost saturated with respect to NaCl at 10° C., which is a satisfactory crystallization temperature. To this liquor sodium carbonate is added, preferably in the proportion of about 60 grams per liter. When sufficient chlorine has been added to chlorinate substantially all this sodium carbonate another equal weight of sodium carbonate is added. This is repeated until a total of 240 grams have been added per liter of the original mother liquor.

If all the sodium carbonate were added at the start the composition of the reaction mixture chlorinated would therefore be as follows:

|  | Weight percent | Mols |
|---|---|---|
| $Na_2CO_3$ | 16.30 | 3.00 |
| $KClO_3$ | 4.05 | 0.65 |
| $NaCl$ | 20.85 | 7.00 |
| $H_2O$ | 58.80 | 64.00 |

Reaction 6 as actually carried out should therefore be written as follows:

$$3Na_2CO_3 + 0.65KClO_3 + 7NaCl + 64H_2O + 3Cl_2 \quad (8)$$
$$\rightarrow NaClO_3 + 0.65KClO_3 + 12NaCl + 55H_2O + 3CO_2$$

It will be noted that in Reaction 8 the water is reduced by evaporation in the proportion of from about 64 mols to about 55 mols. This is very important, as will be shown later.

If it is desired to chlorinate sodium bicarbonate instead of sodium carbonate the analogous reaction is as follows:

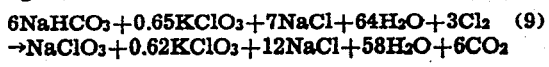

It will be noted that the products of Reaction 9 are slightly more dilute than those of Reaction 8, due to re-formation of 3 mols of $H_2O$. However, since twice as much $CO_2$ is evolved in Reaction 9 as in Reaction 8 this extra quantity of water may be easily carried off during the reaction.

In this case the final quantity of bicarbonate added is of course limited to about 192.5 grams per liter of mother liquor.

The $NaClO_3$ of Reaction 8 or 9 is then converted to $KClO_3$ and $NaCl$ by reaction with $KCl$ as follows:

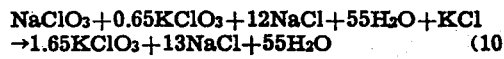

During the chlorination the temperature of course rises. At its conclusion the temperature is 50° to 70° C. The solubility of $KClO_3$ rises rapidly with temperature, while that of $NaCl$ increases only slightly. Therefore at 60° C. the $KClO_3$ formed by the reaction is all or mostly in solution, while the $NaCl$ formed is mostly a precipitate. The $NaCl$ formed may therefore be filtered out. The cake of salt is then washed as hereinafter described, finishing with fresh water, and recycled to the start of the process, diverting to the carbonation as much salt as may be necessary to saturate the cell effluent.

It should be noted that when the final product is $KClO_3$ no sodium leaves the system. Also that $KCl$ brings into the system all the chlorine that leaves as $KClO_3$. Therefore there is no need to add make-up $NaCl$, except to replace minor losses. It is necessary, however, to supply water to the start of the process to furnish the oxygen of the $KClO_3$.

The specific gravity of the filtrate at 60° C. is 1.271 and its composition is as follows:

|  | Weight per cent |
|---|---|
| $KClO_3$ | 14.26 |
| $NaCl$ | 23.10 |
| $H_2O$ | 62.64 |

In order to bring the filtrate slightly below saturation with respect to $NaCl$ a small quantity of water or solution saturated with respect to $KClO_3$ but low in $NaCl$, obtained from the washing of the final product as hereinafter to be described, is now added to the filtrate. After this dilution the composition of the filtrate is approximately as follows:

|  | Weight per cent |
|---|---|
| $KClO_3$ | 14.1 |
| $NaCl$ | 22.7 |
| $H_2O$ | 63.2 |

This filtrate is now cooled to 10° C., whereupon $KClO_3$ corresponding to that produced in Reaction 10 crystallizes out. The crystals of $KClO_3$ are then centrifuged and washed. The wash water naturally becomes saturated with respect to $KClO_3$ and also picks up a little $NaCl$. This is the water added after the filtration and before the crystallization, above stated.

The wash water is not limited to the quantity that is required to be added just prior to crystallization but may be so calculated as to make up all the water carried out by the $CO_2$ in the chlorination reaction. This will be more than is required to be added just prior to crystallization. A part of this is therefore used to wash the cake of salt on the filter as stated above. The balance is returned to the chlorination reaction. This tends to balance the water on the two sides of Equations 8 and 9.

The quantity of wash water added to the filtrate just prior to crystallization affects the purity of the product with respect to contaminating $NaCl$, as follows:

| Wash water added to filtrate, percent by vol. | NaCl in product |
|---|---|
| None | 6 to 8 |
| 5 | 1.5 |
| 10 | 0.6 |

The percentage of $NaCl$ in the product may then be further reduced to 0.4 or less by washing and centrifuging the crystals. From this it will be seen that the process results in a product very low in $NaCl$.

The quantity of water that can be used to wash the produce and be returned to the process without progressively increasing the quantity of water in the process or resorting to vacuum crystallization, and hence the quality of the product, depends directly upon the water removed in the chlorination reaction. This is a fraction of the temperature at which this reaction is carried on. For this reason we carry on the reaction at the highest practicable temperature, namely 50° to 70° C., and preferably nearer the upper of these limits.

If all the carbonate were added to the mother liquor in one installment and no wash water returned during chlorination, the concentration of the reaction mixture would increase appreciably and it would be necessary to add fresh water in order to be able to carry it on. Hence it is very important to add the carbonate by increments not over one-quarter of the total at one time and return the wash water before the chlorination.

The $CO_2$ from Reaction 8 or 9, as the case may be, is of course recycled to Reactions 1 or 2 respectively.

*Example VII.*—The chlorinator was charged with mother liquor containing the following:

|  | Pounds |
|---|---|
| $KClO_3$ | 6.43 |
| $NaCl$ and $H_2O$ | 194.57 |
| Total | 201.00 |

To this were added the following:

| | |
|---|---|
| $Na_2CO_3$ | 40.00 |
| $KCl$ | 9.37 |
| Chlorine | 26.50 |

The products of the chlorination yielded 14.37 pounds of finished crystalline product, corresponding to a net yield of 93.5 percent of the theoretical yield of $KClO_3$.

Referring to the flow sheet:

1 is an electrolytic alkali-chlorine diaphragm cell of the type referred to. 2 is a reservoir for electrolyte which is supplied to the cell through pipe 3. Hydrogen leaves the cell through pipe 35. As this hydrogen does not enter into the present process it may be considered as a byproduct. Chlorine leaves the cell through pipe 15. 4 is a pipe through which the cell effluent flows into funnel 5, whence it is conducted through pipe 6 to carbonator 7.

Since the cell preferably operates continuously and the succeeding steps of the process may be by batches, storage for cell effluent (not shown) may be provided between cell 1 and carbonator 7.

Into carbonator 7, which may be an absorption tower, $CO_2$ from pipe 8 is introduced near its bottom. The product of this reaction, being of low solubility in brine, is precipitated, while the NaCl remains in solution.

The cell effluent, containing approximately 11 percent NaOH and 15½ percent NaCl, is not a saturated solution. It should therefore be brought up to saturation by adding more NaCl, either before or after carbonation. As this salt is more effective in increasing the precipitation of carbonation product if added before carbonation (as shown by comparison of the yields obtained in Examples III and IV) it is preferably added before carbonation.

The carbonate and brine are then passed through pipe 9 to filter 10, which may be of the rotary or other type. In this filter the brine is removed to the interior, whence it may be returned through pipe 11 to reservoir 2 for repassage through the cell. The salt necessary to saturate the cell effluent is introduced at 32. The solids from filter 10 are transferred through pipe or chute 13 to chlorinator 14 where they are brought into contact with mother liquor derived from the crystallizing, centrifuging and washing of the final product, introduced through pipe 26. Chlorine from the cell is then introduced through pipe 15 to chlorinator 14 at a point near its bottom. As the chlorination reaction is only slightly exothermic, the temperature within the chlorinator is kept between 50° and 70° C., by any convenient means (not shown).

In chlorinator 14 carbon dioxide is liberated in accordance with Reactions 8 or 9. This gas is returned through pipe 8 to carbonator 7, there to serve as reagent in Reaction 1 or 2 as the case may be. The moisture carried away from chlorinator 14 by this gas is condensed and removed in dephlegmator 30 and pipe 31, to be later replaced by wash water from the washing of the final product in the centrifuge, as later described.

Before, during or after chlorination if the product is to be $KClO_3$, KCl is likewise introduced into chlorinator 14, as through pipe 16.

The mother liquor and wash water returned through pipe 26, are sufficient to take into solution the chlorate but not the chloride formed by the reaction, at the temperature of reaction, namely 50° to 70° C. Therefore in order to remove the chloride from the chlorate a simple filtration is all that is necessary. Accordingly, the products of the reaction are transferred through sluice 17 to filter 18, which may be of the rotary type as shown. This filter separates out the solid sodium chloride which is then transferred through conduit 19, which may be a conveyor, back to the process. As much of this salt as may be necessary to saturate the cell effluent is diverted through conduit 32 to carbonator 7. The balance is returned to reservoir 2. Water to take this into solution is introduced through pipe 12.

The quantity of KCl introduced at 16 should preferably be less than sufficient to convert all the $NaClO_3$ to $KClO_3$. A small quantity of $NaClO_3$ will then go along with the $KClO_3$ and, being much more soluble, will remain in the mother liquor. The possibility of KCl finding its way back to the cell through conduit 19 is thus avoided. The filtrate from filter 18 is transferred through pipe 20 to crystallizer 21. After addition of the necessary water to inhibit the crystallization of NaCl the filtrate is cooled to 10° C. It may also be seeded with crystals of chlorate. These crystals and mother liquor are transferred through conduit 22, which may be a conveyor, to centrifuge 23. Here the crystals are separated from the mother liquor by centrifuging and then washed with water introduced through pipe 24. A part of the wash water from centrifuge 23 is passed back through pipe 25 to crystallizer 21. A portion of the mother liquor is recycled through pipe 33 to wash the cakes of salt on filter 18. Fresh water may likewise be introduced through pipe 34 to cleanse this cake of salt of mother liquor more completely. The remainder of the wash water, together with the mother liquor, is passed through pipe 26 back to chlorinator 14, as stated above, there to serve as a menstruum for the chlorination reaction and to take the chlorate into solution. The water introduced at 24 plus that introduced at 34 should be sufficient to replace that removed at 31, but no more. The solid washed crystals from centrifuge 23 are then transferred through conduit 27, which may be a conveyor, to a recrystallizer (not shown) and thence to dryer 28 or directly to dryer 28, whence they are delivered to packing drum 29 for the market.

Storage (not shown) may be provided between chlorinator 14 and filter 18; also for wash water and mother liquor in pipes 25 and 26 respectively.

The several reactions of the process may be summed up as follows:

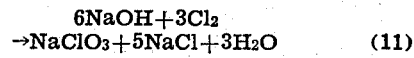

$$6NaOH + 3Cl_2 \rightarrow NaClO_3 + 5NaCl + 3H_2O \quad (11)$$

From Equation 11 it will be seen that five sixths of the sodium that comes from the electrolytic cell as NaOH is recycled as NaCl and only one-sixth requires to be replaced. If the product is $KClO_3$, as in the flow sheet, this sodium is replaced by the potassium of the KCl introduced at 16 and this KCl also brings into the system the chlorine of the $KClO_3$. The oxygen of the $KClO_3$ is supplied by water introduced to the cell at 12. If the product were $NaClO_3$ it would be necessary to introduce to the cell one part of NaCl for each $NaClO_3$ in the final product.

Referring back to Examples VI and VII, it will be seen that our process is capable of a yield of 95 percent in the electrolytic cell, 97.6 percent in the carbonation step and 93.5 percent in the chlorination and finishing steps, an overall yield, from current supplied the cell to finished crystalline product, of over 86 percent. The yield of the best electrolyte chlorate cells is seldom better than 80 percent of $NaClO_3$ in the liquid cell effluent and 75 percent, based upon finished crystalline product. By taking advantage of the most efficient type of alkali-chlorine cell and the most efficient carbonation and chlorination steps that we have been able to work out after careful research, we have therefore been able to increase the overall yield of finished product from about 75 percent to over 86 percent. Moreover, we have been able to avoid the step of evaporating the water out of the caustic alkali solution or out of the solution containing the product, or, on the other hand, of cooling the latter solution to a very low temperature to crystallize out the product, one or more of which steps has, to the best of our knowledge and belief, been an unavoidable feature of all previous processes; and we are thus enabled to save the attendant costs and losses of product. These however, are not the only advantages of our process. In the varying conditions of the chemical industry the demand for any given product is liable to change quickly. An electrolytic chlorate cell installation is capable of producing nothing else and the demand for this product is quite variable and seasonal; whereas, although the demand for caustic soda is variable this product is basic to many industries. By our process, when caustic soda is in more demand than sodium carbonate, as is normally the case, we can produce chlorate from the latter; and when the supply of caustic soda exceeds the demand we can utilize the electrolytic cell installation to produce chlorate. Thus the installation of electrolytic cells may be used for either one of two alternative products and the heavy investment which it represents is better safeguarded. Our process therefore has the advantage of flexibility, which is always an important consideration in the chemical industry.

We claim as our invention:

1. The process for production of alkali metal chlorate from electrolytic caustic soda-chlorine cell effluent with avoidance of evaporation of water therefrom which comprises electrolyzing sodium chloride in an electrolytic cell, carbonating the caustic alkali out of the resulting cell effluent as far as practicable to sodium bicarbonate, filtering out the resulting precipitated carbonation product, recycling the filtrate to the anode compartment of the electrolytic cell, introducing said carbonation product into an aqueous menstruum in quantity sufficient to take into solution at 50° to 70° C. most of the chlorate but only a little of the chloride which may be produced by chlorinating said carbonation product, chlorinating said carbonation product to produce the corresponding chlorate, recycling the resulting carbon dioxide to the carbonation step, filtering out chloride and recycling it to the anode compartment of the electrolytic cell, crystallizing out and removing chlorate from the filtrate, recycling the mother liquor to the chlorination step to serve as menstruum for said carbonation product and introducing into the system make-up water and chloride to supply the oxygen and chlorine withdrawn from it with the product.

2. The process for production of sodium chlorate from electrolytic caustic soda-chlorine cell effluent with avoidance of evaporation of water therefrom which comprises electrolyzing sodium chloride in an electrolytic cell, carbonating the resulting cell effluent as far as practicable to sodium bicarbonate, increasing the precipitation of carbonate by adding more sodium chloride, filtering out the resulting precipitated carbonation product, recycling the filtrate to the anode compartment of the electrolytic cell, introducing said carbonation product into an aqueous menstruum in quantity sufficient to take into solution at 50° to 70° C. most of the chlorate but only a little of the chloride which may be produced by chlorinating said carbonation product, chlorinating said carbonation product to produce the corresponding chlorate, recycling the resulting carbon dioxide to the carbonation step, filtering out chloride and recycling it to the anode compartment of the electrolytic cell, crystallizing out and removing chlorate from the filtrate, recycling the mother liquor to the chlorination step to serve as menstruum for said carbonation product and introducing into the system make-up water and chloride to supply the oxygen and chlorine withdrawn from it with the product.

3. The process for production of sodium chlorate from electrolytic caustic soda-chlorine cell effluent with avoidance of evaporation of water therefrom which comprises electrolyzing sodium chloride in an electrolytic cell, saturating the resulting cell effluent with sodium chloride, carbonating said effluent as far as practicable to sodium bicarbonate, filtering out the resulting precipitated carbonation product, recycling the filtrate to the anode compartment of the electrolytic cell, introducing said carbonation product into an aqueous menstruum in quantity sufficient to take into solution at 50° to 70° C. most of the chlorate but only a little of the chloride which may be produced by chlorinating said carbonation product, chlorinating said carbonation product to produce the corresponding chlorate, recycling the resulting carbon dioxide to the carbonation step, filtering out chloride and recycling it to the anode compartment of the electrolytic cell, crystallizing out and removing chlorate from the filtrate, recycling the mother liquor to the chlorination step to serve as menstruum for said carbonation product and introducing into the system make-up water and chloride to supply the oxygen and chlorine withdrawn from it with the product.

4. The process for production of sodium chlorate from electrolytic caustic soda-chlorine cell effluent with avoidance of evaporation of water therefrom which comprises electrolyzing sodium chloride in an electrolytic cell, carbonating the resulting cell effluent as far as practicable to sodium bicarbonate, saturating said effluent with sodium chloride, filtering out the resulting precipitated carbonation product, recycling the filtrate to the anode compartment of the electrolytic cell, introducing said carbonation product into an aqueous menstruum in quantity sufficient to take into solution at 50° to 70° C. most of the chlorate but only a little of the chloride which may be produced by chlorinating said carbonation product, chlorinating said carbonation product to produce the corresponding chlorate, recycling the resulting carbon dioxide to the carbonation step, filtering out chloride and recycling it to the anode compartment of the electrolytic cell, crystallizing out and removing chlorate from the filtrate, recycling the mother liquor to the chlorination step to serve as menstruum for said carbonation product and introducing into the system make-up water and chloride to supply the oxygen and chlorine withdrawn from it with the product.

5. The process for production of sodium chlorate from electrolytic caustic soda-chlorine cell effluent with avoidance of evaporation of water therefrom which comprises electrolyzing sodium chloride in an electrolytic cell, carbonating the caustic alkali out of the resulting cell effluent as far as practicable to sodium bicarbonate, filtering out the resulting precipitated carbonation product, recycling the filtrate to the anode compartment of the electrolytic cell, introducing said carbonation product into an aqueous menstruum in quantity sufficient to take into solution at 50° to 70° C. most of the chlorate but only a little of the chloride which may be produced by chlorinating said carbonation product, chlorinating said carbonation product to produce the corresponding chlorate, condensing and removing water from the resulting carbon dioxide and recycling the carbon dioxide to the carbonation step, filtering out chloride, washing said chloride and recycling it to the anode compartment of the electrolytic cell, crystallizing chlorate out of the filtrate, washing the crytsals while balancing the quantity of water introduced in this and the previous washing of the chloride against the quantity removed from the carbon dioxide, recycling the mother liquor to the chlorination step to serve as menstruum for said carbonation product and introducing into the system make-up water and chloride to supply the oxygen and chlorine withdrawn from it with the product.

6. The process for production of potassium chlorate from electrolytic caustic soda-chlorine cell effluent with avoidance of evaporation of water therefrom which comprises electrolyzing sodium chloride in an electrolytic cell, carbonating the caustic soda out of the resulting cell effluent as far as practicable to sodium bicarbonate, filtering out the resulting precipitated carbonation product, recycling the filtrate to the anode compartment of the electrolytic cell, introducing said carbonation product into an aqueous menstruum in quantity sufficient to take into solution at 50° to 70° C. most of the chlorate but only a little of the chloride which may be produced by chlorinating said carbonation product, chlorinating said carbonation product to produce the corresponding chlorate, recycling the resulting carbon dioxide to the carbonation step, reacting the resulting chlorate with potassium chloride in quantity slightly less than sufficient to convert all of it to potassium chlorate, filtering out chloride and recycling it to the anode compartment of the electrolytic cell, crystallizing out and removing potassium chlorate from the filtrate, recycling the mother liquor to the chlorination step to serve as menstruum for said carbonation product and introducing to the system water to supply the oxygen withdrawn from it with the product.

7. The process for production of sodium chlorate from electrolytic caustic soda-chlorine cell effluent with avoidance of evaporation of water therefrom which comprises electrolyzing sodium chloride in an electrolytic cell, carbonating the caustic alkali out of the resulting cell effluent as as far as practicable to sodium bicarbonate, filtering out the resulting precipitated carbonation product, recycling the filtrate to the anode compartment of the electrolytic cell, introducing said carbonation product by increment into an aqueous menstruum in quantity sufficient to take into solution at 50° to 70° C. most of the chlorate but only a little of the chloride which may be produced by chlorinating said carbonation product, substantially completely chlorinating each increment of carbonation product, to produce the corresponding chlorate, so that thickening and foaming are controlled, recycling the resulting carbon dioxide to the carbonation step, filtering out chloride and recycling it to the anode compartment of the electrolytic cell, crystallizing out and removing chlorate from the filtrate, recycling the mother liquor to the chlorination step to serve as menstruum for said carbonation product and introducing into the system make-up water and chloride to supply the oxygen and chlorine withdrawn from it with the product.

8. In the production of sodium chlorate the steps which comprise introducing a carbonation product of caustic soda by increments into an aqueous menstruum, substantially completely chlorinating each increment of carbonation product to produce the corresponding chlorate, so that thickening and foaming are controlled, continuing the addition and chlorination of carbonation product by increments until an amount of carbonation product equivalent to substantially 240 grams of sodium carbonate has been added per liter of menstruum, filtering out chloride, crystallizing out chlorate from the filtrate and recycling the mother liquor from the crystallization step to the chlorination step to serve as a menstruum for said carbonation product.

9. In the production of sodium chlorate the steps which comprise introducing a carbonation product of caustic soda by increments into an aqueous menstruum, substantially completely chlorinating each increment of carbonation product to produce the corresponding chlorate, so that thickening and foaming are controlled, continuing the addition and chlorination of carbonation product by increments until an amount of carbonation product equivalent to substantially 240 grams of sodium carbonate has been added per liter of menstruum, filtering out chloride, crystallizing out chlorate from the filtrate, washing the crystals and recycling the mother liquor from the crystallization step and the wash water from the washing step to serve as a menstruum for said carbonation product.

10. In the production of sodium chlorate the steps which comprise introducing sodium carbonate by increments into an aqueous menstruum, substantially completely chlorinating each increment of carbonate to produce the corresponding chlorate, so that thickening is controlled, continuing the addition and chlorination of sodium carbonate by increments until substantially 240 grams have been added per liter of menstruum, filtering out chloride, crystallizing out chlorate from the filtrate and recycling the mother liquor from the crystallization step to serve as a menstruum for said carbonate.

11. In the production of sodium chlorate the steps which comprise introducing sodium bicarbonate by increments into an aqueous menstruum, substantially completely chlorinating each increment of bicarbonate to produce the corresponding chlorate, so that foaming is controlled, continuing the addition and chlorination of sodium bicarbonate until an amount equivalent to substantially 240 grams of sodium carbonate has been added per liter of menstruum, filtering out chloride, crystallizing out chlorate from the filtrate and recycling the mother liquor from the crystallization step to serve as a menstruum for said bicarbonate.

12. The process for production of sodium chlorate from electrolytic caustic soda-chlorine cell effluent with avoidance of evaporation of water therefrom which comprises electrolyzing sodium chloride in an electrolytic cell, saturating the resulting cell effluent by adding sodium chloride thereto, carbonating the caustic soda out of said effluent, under a slight pressure, as far as practicable to sodium bicarbonate, with a yield of precipitated bicarbonate above 90 percent of the theoretical yield thereof, filtering out the resulting precipitated bicarbonate, recycling the filtrate to the anode compartment of the electrolytic cell, introducing the precipitated bicarbonate into an aqueous menstruum in quantity sufficient to take into solution at 50° to 70° C. most of the chlorate but only a little of the chloride which may be produced by chlorinating said bicarbonate, chlorinating said bicarbonate to produce the corresponding chlorate, recycling the resulting carbon dioxide to the carbonation step, filtering out chloride and recycling it to the anode compartment of the electrolytic cell, crystallizing out and removing chlorate from the filtrate, recycling the mother liquor to the chlorination step to serve as menstruum for said bicarbonate and introducing into the system make-up water and chloride to supply the oxygen and chlorine withdrawn from it with the product.

13. The process for production of potassium chlorate from electrolytic caustic soda-chlorine cell effluent with avoidance of evaporation of water therefrom and with an overall yield thereof above 80 per cent which comprises electrolyzing sodium chloride in an electrolytic cell, saturating the resulting cell effluent by adding sodium chloride thereto, carbonating the caustic soda out of said effluent as far as practicable to sodium bicarbonate, under a slight pressure, filtering out the resulting precipitated bicarbonate, recycling the filtrate to the anode compartment of the electrolytic cell, introducing the precipitated bicarbonate into an aqueous menstruum in quantity sufficient to take into solution at 50° to 70° C. most of the chlorate but only a little of chloride which may be produced by chlorinating said bicarbonate, chlorinating said bicarbonate to produce the corresponding chlorate, condensing and removing water from the resulting carbon dioxide and recycling the carbon dioxide to the carbonation step, reacting the resulting chlorate with potassium chloride in quantity slightly less than sufficient to convert all of it to potassium chlorate, filtering out the chloride, washing said chloride and recycling it to the anode compartment of the electrolytic cell, crystallizing out and removing the potassium chlorate from the filtrate, washing the chlorate crystals while balancing the water introduced in this and the previous washing step against the water removed with the carbon dioxide, recycling the mother liquor to the chlorination step to serve as menstruum for said bicarbonate and introducing into the system water to supply the oxygen withdrawn from it with the product.

14. The process for production of sodium chlorate from electrolytic caustic soda-chlorine cell effluent with avoidance of evaporation of water therefrom, which comprises electrolyzing sodium chloride in an electrolytic cell, carbonating the caustic alkali out of the resulting effluent as far as practicable to sodium bicarbonate, filtering out the resulting carbonation product, recycling the filtrate to the anode compartment of the electrolytic cell, chlorinating said carbonation product to the corresponding chlorate, filtering out chloride and recycling it to the anode compartment of the electrolytic cell and removing the chlorate from the filtrate.

15. The process for production of sodium chlorate from electrolytic caustic soda-chlorine cell effluent with avoidance of evaporation of water therefrom, which comprises electrolyzing sodium chloride in an electrolytic cell, carbonating the caustic alkali out of the resulting effluent as far as practicable to sodium bicarbonate, filtering out the resulting precipitated carbonation product, introducing said carbonation product into an aqueous menstruum in quantity sufficient to take into solution most of the chlorate but only a little of the chloride which may be produced by chlorinating said carbonation product, chlorinating said carbonation product to the corresponding chlorate, recycling the resulting carbon dixoide to the carbonation step, filtering out chloride and recycling it to the anode compartment of the electrolytic cell, crystallizing out and removing chlorate from the filtrate, recycling the mother liquor to the chlorination step to serve as menstruum for said carbonation product and introducing into the system make-up water and chloride to supply the oxygen and chlorine withdrawn from it with the product.

SIDNEY G. OSBORNE.
ROBERT B. LOWRY.
WALTER S. BEANBLOSSOM.